(12) United States Patent
Gopalakrishnan et al.

(10) Patent No.: US 10,911,318 B2
(45) Date of Patent: Feb. 2, 2021

(54) FUTURE NETWORK CONDITION PREDICTOR FOR NETWORK TIME SERIES DATA UTILIZING A HIDDEN MARKOV MODEL FOR NON-ANOMALOUS DATA AND A GAUSSIAN MIXTURE MODEL FOR ANOMALOUS DATA

(71) Applicant: Futurewei Technologies, Inc., Plano, TX (US)

(72) Inventors: Nandu Gopalakrishnan, Chatham, NJ (US); Yirui Hu, Piscataway, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 1330 days.

(21) Appl. No.: 15/077,762

(22) Filed: Mar. 22, 2016

(65) Prior Publication Data

US 2016/0285700 A1    Sep. 29, 2016

Related U.S. Application Data

(60) Provisional application No. 62/137,669, filed on Mar. 24, 2015.

(51) Int. Cl.
*H04L 12/24* (2006.01)
*G06N 20/00* (2019.01)
(Continued)

(52) U.S. Cl.
CPC ............... *H04L 41/16* (2013.01); *G06N 5/04* (2013.01); *G06N 7/005* (2013.01); *G06N 20/00* (2019.01);
(Continued)

(58) Field of Classification Search
CPC ... H04L 41/16; H04L 41/0823; H04L 41/142; H04L 41/147; G06N 5/04; G06N 7/005; G06N 99/005
See application file for complete search history.

(56) References Cited

U.S. PATENT DOCUMENTS 8,554,703 B1    10/2013   Lin et al.
2006/0293777 A1   12/2006   Breitgand et al.
(Continued)

FOREIGN PATENT DOCUMENTS

CN    101651568 A    2/2010
CN    102355381 A    2/2012
CN    103326903 A    9/2013

*Primary Examiner* — Alexey Shmatov
*Assistant Examiner* — Robert Bejcek, II
(74) *Attorney, Agent, or Firm* — Slater Matsil, LLP

(57) ABSTRACT

System and method embodiments are provided for adaptive anomaly detection based predictor for network data. In an embodiment, a computer-implemented method in a network component for predicting values of future network time series data includes receiving, with one or more receivers, network time series data; determining, with one or more processors, whether an anomaly is detected in the network time series data; generating, with the one or more processors, a prediction associated with the network data according to a primary predictor when no anomaly is detected in the network time series data; generating, with the one or more processors, the prediction associated with the network data according to an alternative predictor when an anomaly in the network time series data is detected; and sending, with one or more transmitters, the prediction to a network controller, wherein the network controller uses the prediction to adjust network parameters.

18 Claims, 8 Drawing Sheets

(51) Int. Cl.
*G06N 5/04* (2006.01)
*G06N 7/00* (2006.01)

(52) U.S. Cl.
CPC ........ *H04L 41/0823* (2013.01); *H04L 41/142* (2013.01); *H04L 41/147* (2013.01)

(56) References Cited

U.S. PATENT DOCUMENTS

| | | | |
|---|---|---|---|
| 2007/0299798 A1* | 12/2007 | Suyama | G06F 17/18 706/21 |
| 2010/0027432 A1* | 2/2010 | Gopalan | H04L 41/142 370/252 |
| 2012/0209568 A1 | 8/2012 | Arndt et al. | |
| 2012/0215735 A1 | 8/2012 | Abielmona et al. | |
| 2013/0258865 A1 | 10/2013 | Kovvali et al. | |
| 2014/0122370 A1* | 5/2014 | Jamal | G06Q 30/0201 705/348 |
| 2014/0336960 A1* | 11/2014 | Haghighat-Kashani | G06Q 10/04 702/60 |
| 2015/0317589 A1* | 11/2015 | Anderson | G06Q 10/08 705/7.25 |
| 2015/0333992 A1* | 11/2015 | Vasseur | H04L 12/4633 370/252 |

* cited by examiner

FUTURE NETWORK CONDITION PREDICTOR FOR NETWORK TIME SERIES DATA UTILIZING A HIDDEN MARKOV MODEL FOR NON-ANOMALOUS DATA AND A GAUSSIAN MIXTURE MODEL FOR ANOMALOUS DATA

CROSS-REFERENCE TO RELATED APPLICATIONS

This application claims the benefit of U.S. Provisional Application No. 62/137,669, filed on Mar. 24, 2015, which application is hereby incorporated by reference.

TECHNICAL FIELD

The present invention relates to network management and, in particular embodiments, to adaptive, anomaly detection based predictor for network time series data.

BACKGROUND

Traffic data changes over time. However often such changes in time have an underlying pattern, for example, seasonality, trend, inter-variable correlation, etc. Algorithms based on machine learning principles are capable of powerful pattern recognition and are therefore desirable as they can automatically uncover and exploit the structure within the historical data to characterize the nature of traffic behaviors and predict future performance (KPIs, traffic etc.) given the past and present.

To this end, time series prediction algorithms are "trained" (parameters optimized) on historical data and applied online to predict next values given the present and recent past (e.g., in a window) values of the data variables. Accuracy of the prediction is very important as the underlying application makes decision choices (e.g., Wireless Network Self Optimization or SON, e.g., Mobility Load Balancing) based on the future predicted value of key performance metrics.

SUMMARY

In an embodiment, a computer-implemented method in a network component for predicting values of future network time series data includes receiving, with one or more receivers, network time series data; determining, with one or more processors, whether an anomaly is detected in the network time series data; generating, with the one or more processors, a prediction associated with the network data according to a primary predictor when no anomaly is detected in the network time series data; generating, with the one or more processors, the prediction associated with the network data according to an alternative predictor when an anomaly in the network time series data is detected; and sending, with one or more transmitters, the prediction to a network controller, wherein the network controller uses the prediction to adjust network parameters.

In an embodiment, a network component includes a processor and a non-transitory computer readable storage medium storing programming for execution by the processor, the programming including instructions for: receiving, at the network component, network time series data; determining, with the network component, whether an anomaly is detected in the network time series data; generating a prediction associated with the network data according to a primary predictor when no anomaly is detected in the network time series data; generating the prediction associated with the network data according to an alternative predictor when an anomaly in the network time series data is detected; and sending, with the network component, the prediction to a network controller, wherein the network controller uses the prediction to adjust network parameters.

In an embodiment, a non-transitory computer-readable media storing computer instructions for predicting values of future network time series data, that when executed by one or more processors, cause the one or more processors to perform the steps of: training an adaptive anomaly detection based predictor with training data; receiving network time series data; determining whether to use a primary predictor or an alternate predictor according to whether an anomaly is detected in the network time series data; generating a prediction associated with the network data according to a primary predictor when no anomaly is detected in the network time series data; generating the prediction associated with the network data according to an alternative predictor when an anomaly in the network time series data is detected; and sending the prediction to a network controller, wherein the network controller uses the prediction to adjust network parameters.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
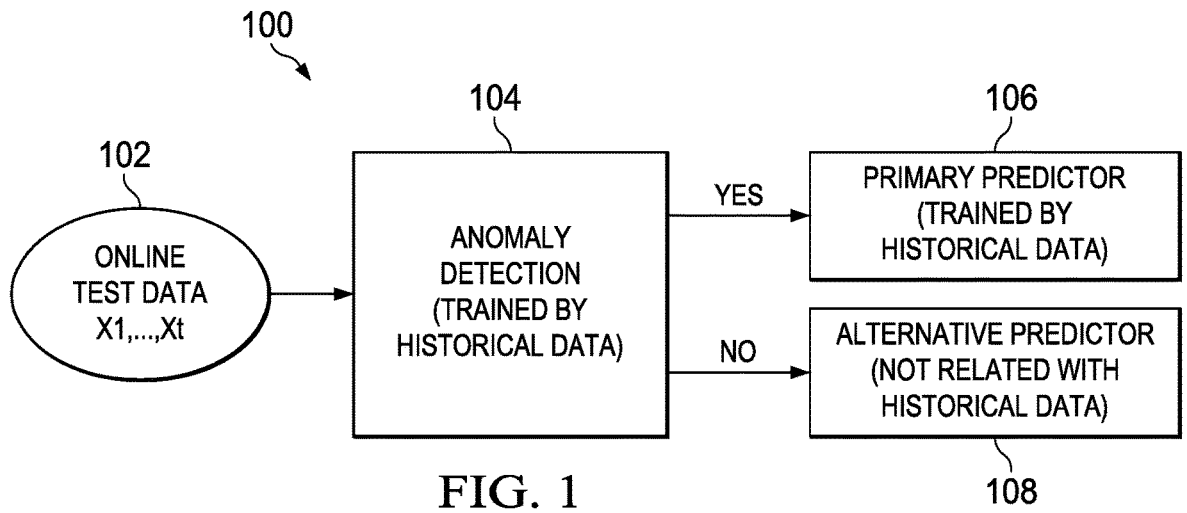
FIG. 1 is a flowchart that illustrates an embodiment of an adaptive predictor method.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Network data (e.g., traffic, Key Performance Indicator (KPI) metrics) time series prediction, in particular for wireless networks, at both the Radio Network Controller (RNC) level and the cellular level is one problem solved by the various disclosed embodiment systems and methods.

Traffic data changes over time. However often such changes in time have an underlying pattern. For example, the pattern in changes may be seasonal, may follow a trend, may have inter-variable correlation, etc. Algorithms based on machine learning principles are capable of powerful pattern recognition and are, therefore, desirable as they can automatically uncover and exploit the structure within the historical data to characterize the nature of traffic behaviors and predict future performance (KPIs, traffic, etc.) given the past performance and the present performance.

To this end, time series prediction algorithms are "trained" (parameters optimized) on historical data and applied online to predict next values given the present and recent past (e.g., in a window) values of the data variables. Accuracy of the prediction is very important as the underlying application makes decision choices (e.g., Wireless Network Self Optimization, Self Organizing Networks (SONs), Mobility Load Balancing, etc.) based on the future predicted value of key performance metrics.

Predictions are made from the intrinsic "natural" structure in the data learned by advanced models such as unsupervised clustering mechanisms (including hidden variable or cluster state transitions) and Supervised Time Series models using historical data.

However, it has been found that, at times, the intrinsic natural structure is broken suddenly when the predictor becomes less accurate or even useless as a prediction of future conditions. Often the reason the predictor becomes temporarily obsolete is unknown. The data generated in such cases is likely to have strange or random patterns and unusual correlation and evolution behavior.

However, it is still desirable to predict future values, but this is difficult with a scarcity of training data, which is often the case when the intrinsic natural structure is broken suddenly. The original historical data may not have examples of such unusual patterns/behavior to be of use. Furthermore, there may not be enough data and resources online to quickly learn new patterns/behavior of the time series.

In such situations, it is desirable to be able to answer the following questions. What is the best prediction now that the system is observing an unusual series that is hard to capture? Is the change detectable by the system? Is it worth sticking to the old "learned" prediction model?

Embodiments of this disclosure provide an adaptive predictor that provides better prediction for network features with more accuracy and adapts to sudden changes with relatively low complexity.

In an embodiment, for predictable data with no internal structure (or learned model) collapse, i.e., online data behaves similar to historical data, the primary predictor can be used. However, for data that significantly differs from historical data in terms of internal structure (or learned model), the alternative adaptive predictor can be used, which adapts to the changes. In one embodiment, the alternative adaptive predictor predicts that the next value will be equal to or nearly equal to the most recent value or an average of several most recent data values.

In such cases of internal structure (or learned model) collapse, if the change can be automatically sensed (detected) from the recent data behavior quickly, then it may be better (from an accuracy perspective) to revert to a simple current data predictor, since at the minimum, the current data conforms to the "new unknown" structure albeit with a time lag.

In an embodiment, a method for anomaly detection based prediction for network time series data includes determining whether network data is likely given historical data; upon a determination that the network data is likely, generating a prediction associated with the network data using a primary predictor; and upon a determination that the network data is unlikely, generating the prediction associated with the network data using an alternative predictor.

In an embodiment, an adaptive predictor applies alternative prediction tools when the primary prediction models are unlikely to predict for test data series.

Primary predictor:
   Multi-cluster models: Hidden Markov Model (HMM) Gaussian Mixture Model (GMM)
   Time series models: VAR, ARIMA.
Alternative predictor:
   Current data predictor
Change Detector:
   Anomaly Detection Models (esp. those that involve the TIME variable, e.g., GPLSA, HMM).

In an embodiment, when no change is sensed (due to no abnormal changes in normal patterns) then the primary predictor continues to output high quality predictions as usual.

In an embodiment, the adaptive procedure is automatically driven by the likelihood of online data, which is calculated based on primary model trained by historical data. Thus, in an embodiment, two kinds (or modes) of predictors are synthesized or efficiently combined such that the two kinds (or modes) of predictors turn on (and off) at appropriate times to yield the best quality (accuracy) prediction possible.

FIG. 1 is a flowchart that illustrates an embodiment of an adaptive predictor method 100. The method 100 begins at block 102 where online test data is received. At block 104, anomaly detection is performed. The anomaly detection is trained by historical data. At block 106, a primary predictor, trained by historical data, is used if no anomaly is detected in the data. At block 108, an alternative predictor is used if an anomaly is detected. In an embodiment, an anomaly is detected using a HMM. In an embodiment, an anomaly is detected by determining a likelihood that the primary predictor will accurately predict a next observed data value within a pre-specified error range. In other words, the likelihood that the primary predictor will differ from the next observed data value by less than a pre-specified error range. In an embodiment, an anomaly is determined by comparing previous predictions determined according to the primary predictor with observed values and if the difference between the two exceeds a predetermined value, determining that an anomaly has occurred. In an embodiment, an anomaly is detected when the number of predicted values determined according to the primary predictor that differ from corresponding observed values by more than a threshold exceeds a predefined number within a specified time period or window. In an embodiment, determining whether an anomaly is detected includes determining a likelihood of occurrence of the observed data point. In an embodiment, the anomaly is detected when the number of calculated likelihood values that fall below a threshold exceeds a predefined number within a specified time period. In an embodiment, the likelihood is computed according to a Gaussian Mixture Model (GMM) model or a Hidden Markov Model (HMM) model built (i.e., parameters learned) from the historical data.

In an embodiment, the mathematical formula for predicting Xt+1 is as follows:

$$Pred(X_{t+1}) = \begin{cases} \overline{X_{t+1}}, & \text{if not Anomaly} \\ X_t, & \text{if Anomaly} \end{cases},$$

where $\overline{X_{t+1}}$ is the value predicted using the primary predictor and $X_t$ is the value predicted using the alternate predictor, which in this embodiment, uses the immediate previous value of X.

Note: There are several ways for choosing an alternative predictor. For simplicity of illustration, here we choose the current data predictor, which predicts using the previous observation. However, in other embodiments, other alternate predictors may be used. Also, in an embodiment, for convenience, we can efficiently reuse the same model, as well as the historical data, for both the Anomaly Detection and Primary Prediction. In an embodiment, the Hidden Markov Model (HMM) is used for both Anomaly Detection and Primary Prediction.

In an embodiment, an adapted Hidden Markov Model (HMM) predictor is utilized in which HMM-likely series are predicted using the trained model, while HMM-unlikely series are predicted by an alternative current data predictor. Embodiments of the disclosed Adapted HMM predictor can address problems that arise due to the scarcity of training data and unusual series.

Figure 2:
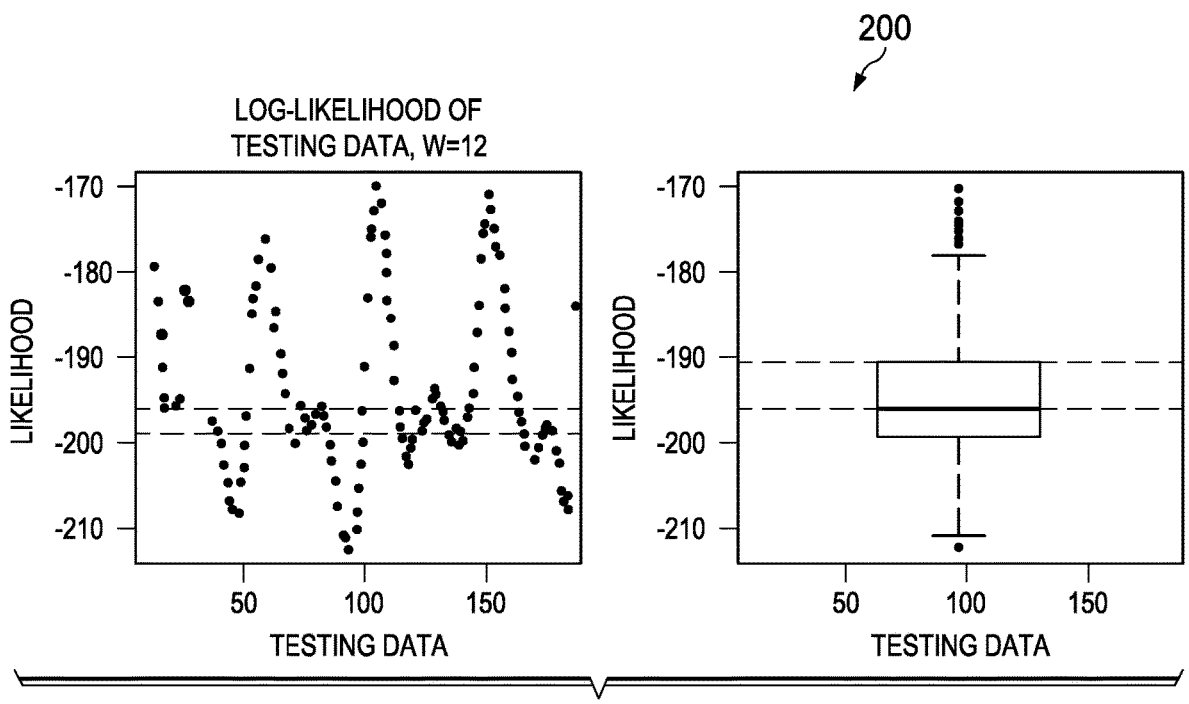
FIG. 2 is a diagram that illustrates testing data associated with the HMM predictor.

FIG. 2 is a diagram that illustrates testing data 200 associated with the HMM predictor.

Figure 3:
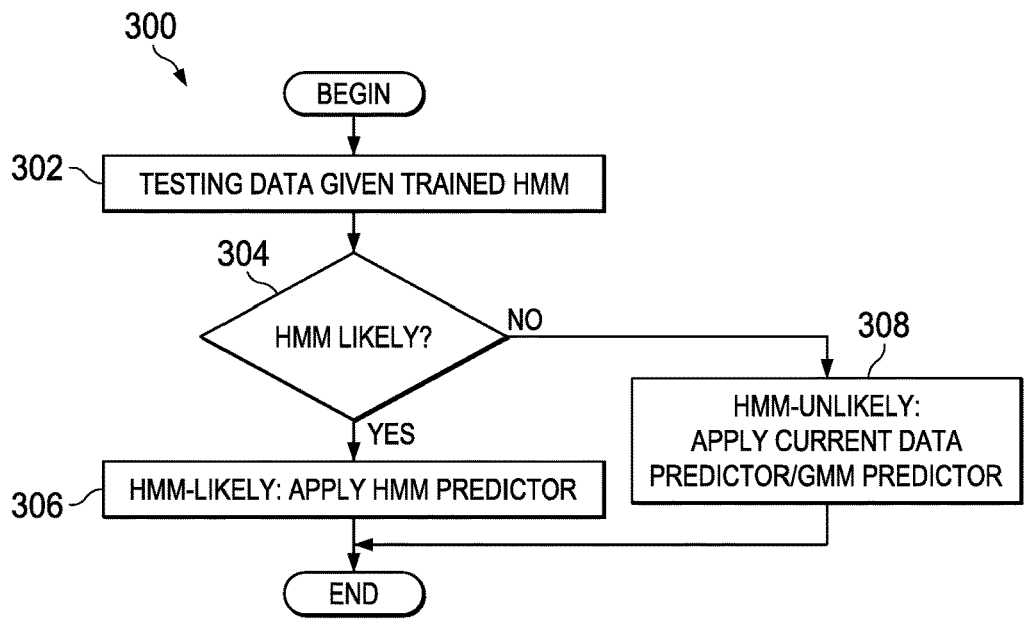
FIG. 3 is a flowchart of an embodiment of a method for HMM Prediction.

FIG. 3 is a flowchart of an embodiment of a method 300 for HMM Prediction. The method 300 begins at block 302 where testing data is provided to a trained HMM. At block 304, the method 300 determines whether HMM is likely. If, at block 304, the method 300 determines that HMM is likely, then the method 300 proceeds to block 306 where the HMM predictor is applied, after which, the method 300 may end. If, at block 304, the method 300 determines that HMM is unlikely, then the method 300 proceeds to block 308 where the current data predictor or GMM predictor is applied, after which, the method 300 may end.

Figure 4:
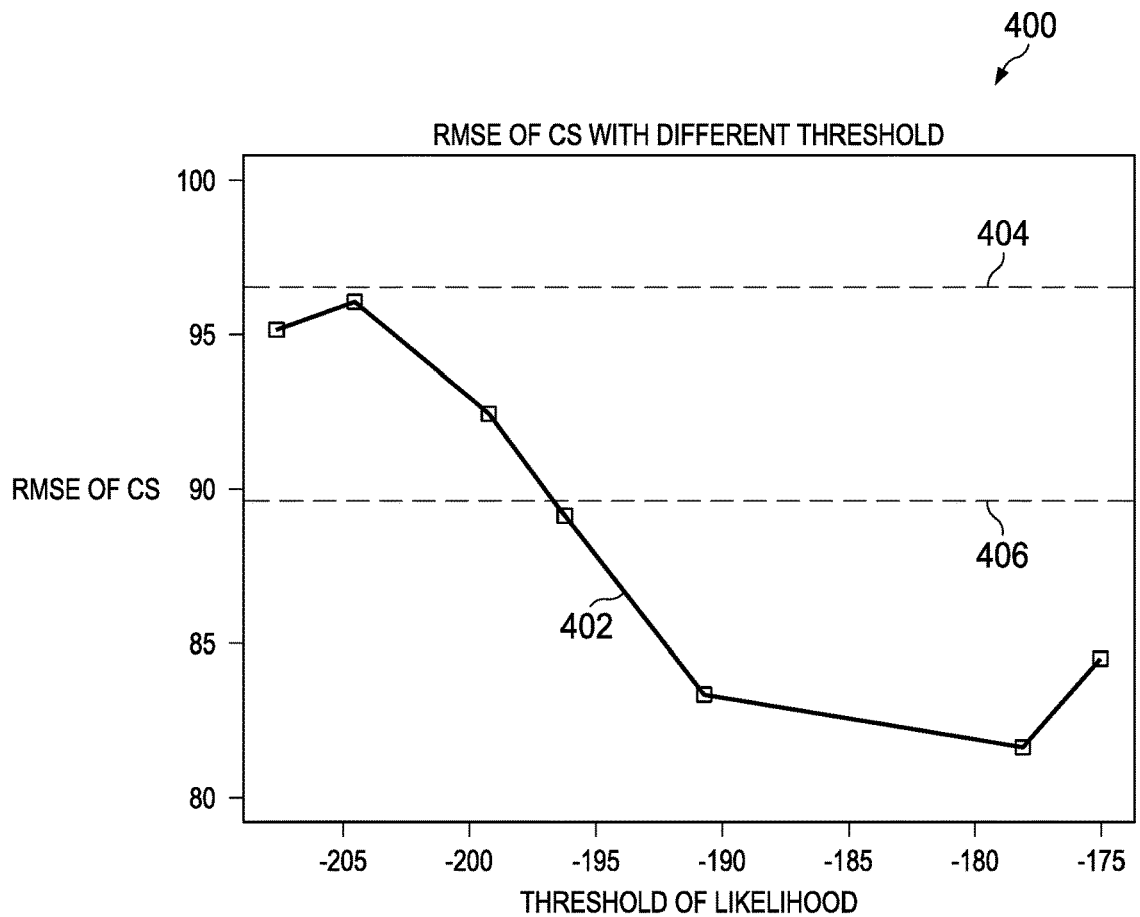
FIG. 4 is a diagram illustrating testing results for circuit switched (CS) traffic associated with the HMM predictor.

FIG. 4 is a diagram illustrating testing results 400 for circuit switched (CS) traffic associated with the HMM predictor. The line labeled 402 shows RMSE of the disclosed adaptive anomaly based predictor for various thresholds of likelihoods. The line labeled 404 shows the root mean square error (RMSE) of the HMM predictor and the line labeled 406 shows the RMSE of the current data predictor.

Figure 5:
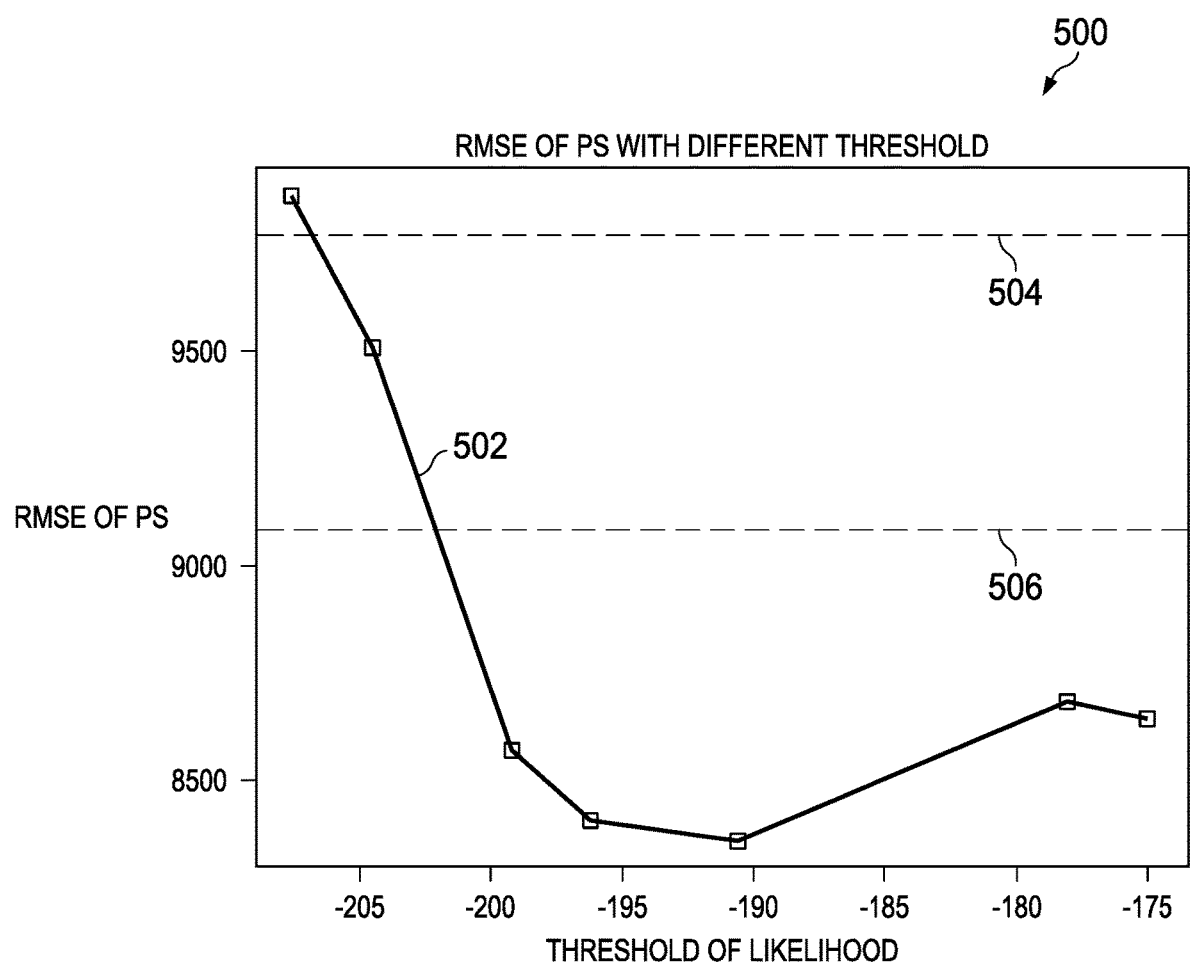
FIG. 5 is a diagram illustrating testing results for packet switched (PS) traffic associated with the HMM predictor.

FIG. 5 is a diagram illustrating testing results 500 for packet switched (PS) traffic associated with the HMM predictor. The line labeled 502 shows RMSE of the disclosed adaptive anomaly based predictor for various thresholds of likelihoods. The line labeled 504 shows the RMSE of HMM predictor. The line labeled 506 shows the RMSE of current data predictor.

In both the CS and PS cases, the higher a threshold is, it is more unlikely to apply HMM predictor.

After setting the threshold by median (likelihood), the adapted HMM predictor always performs better than both the HMM and the current data predictor as shown in FIGS. 4 and 5. For CS traffic test in FIG. 4, with a threshold of median (likelihood) of a value between −200 and −195 on the threshold of likelihood, the adapted HMM predictor always performs better. For PS traffic test in FIG. 5, with a threshold of median (likelihood) of a value of around −200 on the threshold of likelihood, the adapted HMM predictor always performs better than either the HMM or the current data predictor.

The Adaptive Predictor can not only predict for normal patterns, for example, cyclical (seasonal) data, but also for unusual patterns, for example, sudden changes which are unlikely to be predicted well using normal historical patterns. In various embodiments, the advantages may include one or more of the following:

1. Increased prediction accuracy by using alternative prediction tool when the primary prediction model is unlikely.

2. Being able to predict for unusual patterns in testing data. Adapt to testing data that are not necessary to have similar patterns in training data. In practical systems with changing dynamics, historical patterns change for various reasons requiring our novel Adaptive Predictor to manage the situation robustly while the primary is undergoing re-training.

3. More efficient since it is easy to conduct.

The practical benefits of embodiments of this disclosure are expected to be good because predictions based on big data patterns (inter-variable correlations and correlations with past and future time values) are emerging to be an important aspect of future Network Management Decision making (offline and online). The coming generations of cellular networks will be larger scale and Self Organizing (and ultimately Self Everything)—such capabilities are demanded to meet economies of scale in ultra-dense Small Cell based Heterogeneous Networks. Such types of network intelligence require among other things: (big) data driven self-optimizing (SON) and decision taking capabilities wherein prediction (temporal or spatial) plays a critical role. Another example is use on testing data points of Predictive Analytics Model (for KPIs etc.).

Clearly, prediction must be accurate and sensitive to sudden changes. The disclosed methods for Adaptive Prediction provide these advantages with low complexity of implementation in a fully automatic, data driven solution.

The disclosed Adaptive Predictor combines (or selects between) the primary prediction tool with an alternative predictor in a novel way (triggered by an Anomaly Detector), which thus has advantages over either of them. It is more adaptive to sudden changes than prior primary predictor. Also, it is more effective than simply applying the alternative current data predictor at all times (i.e., use the primary when data behavior is as expected or predictable).

Consequently, we achieve the best of both worlds (primary and alternative predictor modes) and highest possible accuracy, by maximizing accuracy in either mode of operation, as long as we are able to detect the mode change and switch (aided by sophisticated Anomaly Detection algorithms).

Figure 6:
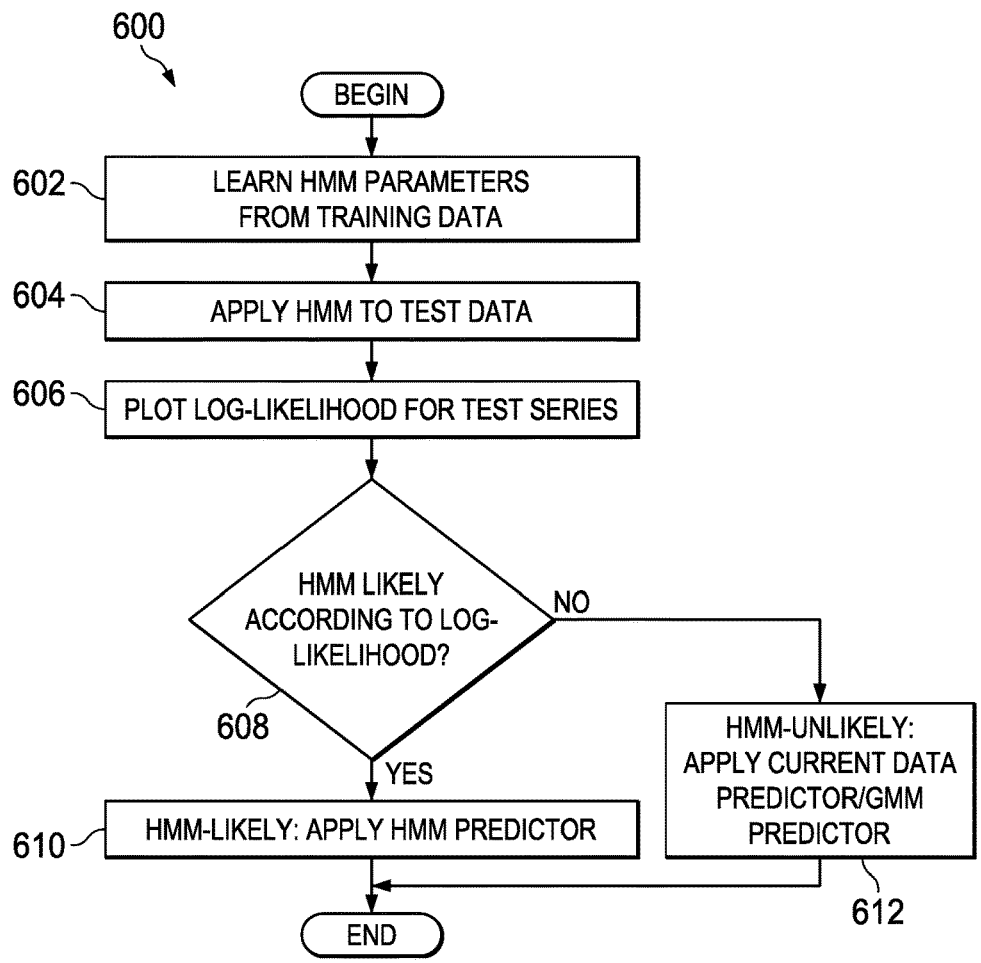
FIG. 6 is a flowchart of an embodiment of an adaptive predictor method.

FIG. 6 is a flowchart of an embodiment of an adaptive predictor method 600. The method 600 begins at block 602 where a prediction unit learns HMM parameters from training data. At block 604, the prediction unit applies the HMM to test data. At block 606, the prediction unit plots or determines a log-likelihood for the test series. At block 608, the prediction unit determines if the HMM is likely to produce accurate results according to the log-likelihood. If at block 608, the HMM is likely, then the method 600 proceeds to block 610 where the prediction unit applies the HMM predictor, after which, the method 600 may end. If, at block 608, the HMM is unlikely, then the method 600 proceeds to block 612 where the prediction unit applies the current data predictor or the GMM predictor, after which, the method 600 may end.

In the absence of labeled data, multiple cluster-based analytical models can be applied on traffic data to organize it into several groups. We can then learn and obtain insights into mathematical structure of each group and the relationships to an individual data point.

Hidden Markov Model (HMM) is a powerful and sophisticated algorithm which combines the past and the present for time series prediction. HMM is well known in Voice Recognition, Robot Position Localization, Bio-informatics, etc. HMM is a good candidate for DR dynamic traffic map, cell outage (sleeping cell) detection, etc.

Gaussian Mixture Model (GMM) is a purely historical predictor which does not consider the time-correlation between adjacent time series points. It is an alternative algorithm for historically consistent predictable patterns where the data values lie within the learned clusters' defined ranges.

Time series analysis accounts for the fact that data points taken over time may have an internal structure (such as autocorrelation, trend or seasonal variation) that should be accounted for.

Time series forecasting is the use of a model (typically regression) to predict future values based on previously observed values. Examples of time series models include Vector Auto Regression (VAR) and Auto Regressive Integrated Moving Average (ARIMA).

The current data predictor is a simple methodology which simply predicts for the future step the last observed values of the variables, and thus whose prediction ability becomes much worse as step increases.

All of these sophisticated predictors above (except the simple current data predictor) work reasonably well on data that have the structures the underlying models can learn. However, when the underlying structure relating the variables (and their next values) collapses (usually for unknown and unexpected reasons), these sophisticated predictors fail badly resulting in heavy prediction error.

In an embodiment, the disclosed adaptive predictor applies alternative prediction tools when the primary prediction models are unlikely to predict for test data series. In other words, the change in the structure of the online data is first detected based on likelihood (as an anomaly). The disclosed adaptive procedure is automatically driven by the likelihood of online data (i.e., triggered by anomaly detection), which is calculated based on primary model trained by historical data. In particular, the same historical data that was used to train the predictor's parameters can be used to also train the likelihood model (used later online to detect anomalies).

In such cases of internal structure (or trained model) collapse, if the change can be automatically sensed (detected) from the recent data behavior quickly, then it may be better (from an accuracy perspective) to revert to a simple current data predictor, since at the minimum, the current data conforms to the "new unknown" structure albeit with a time lag.

In an embodiment, the Hidden Markov Model (HMM) is used as the primary predictor and, in some embodiments, also as the anomaly detector. HMM is a powerful and sophisticated algorithm for time series data. The HMM parameters are trained using the Baum Welch (EM) algorithm that maximizes the likelihood of historical training data.

Figure 7:
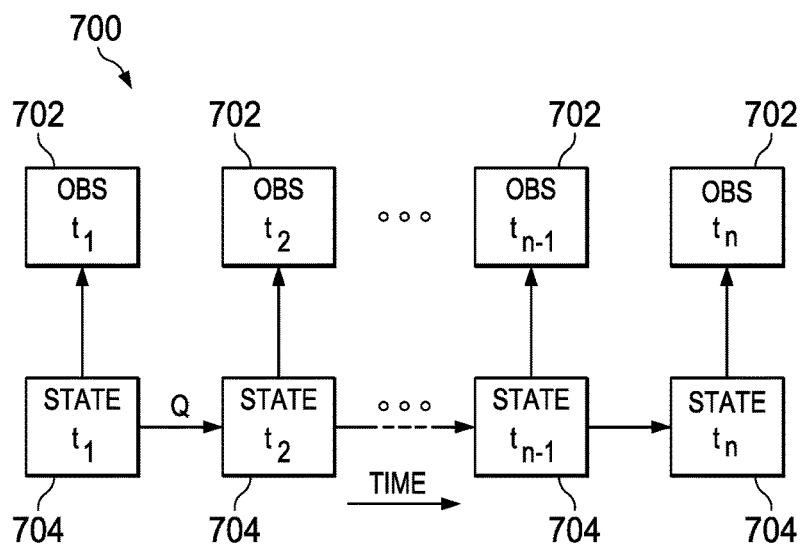
FIG. 7 is a block diagram illustrating a Baum Welch (EM) algorithm.

FIG. 7 is a block diagram illustrating a Baum Welch (EM) algorithm. Block 702 are observables at times $t_1, t_2, \ldots, t_{n-1}$, and $t_n$. Blocks 704 are the corresponding states at times $t_1, t_2, \ldots, t_{n-1}$, and $t_n$. The observable 702 is related to the state 704 by e and a future state (e.g., state $t_2$) is related to a previous state (e.g., state $t_1$) by Q. Baum Welch (EM) algorithms are well known to those of ordinary skill in the art.

Figure 8:
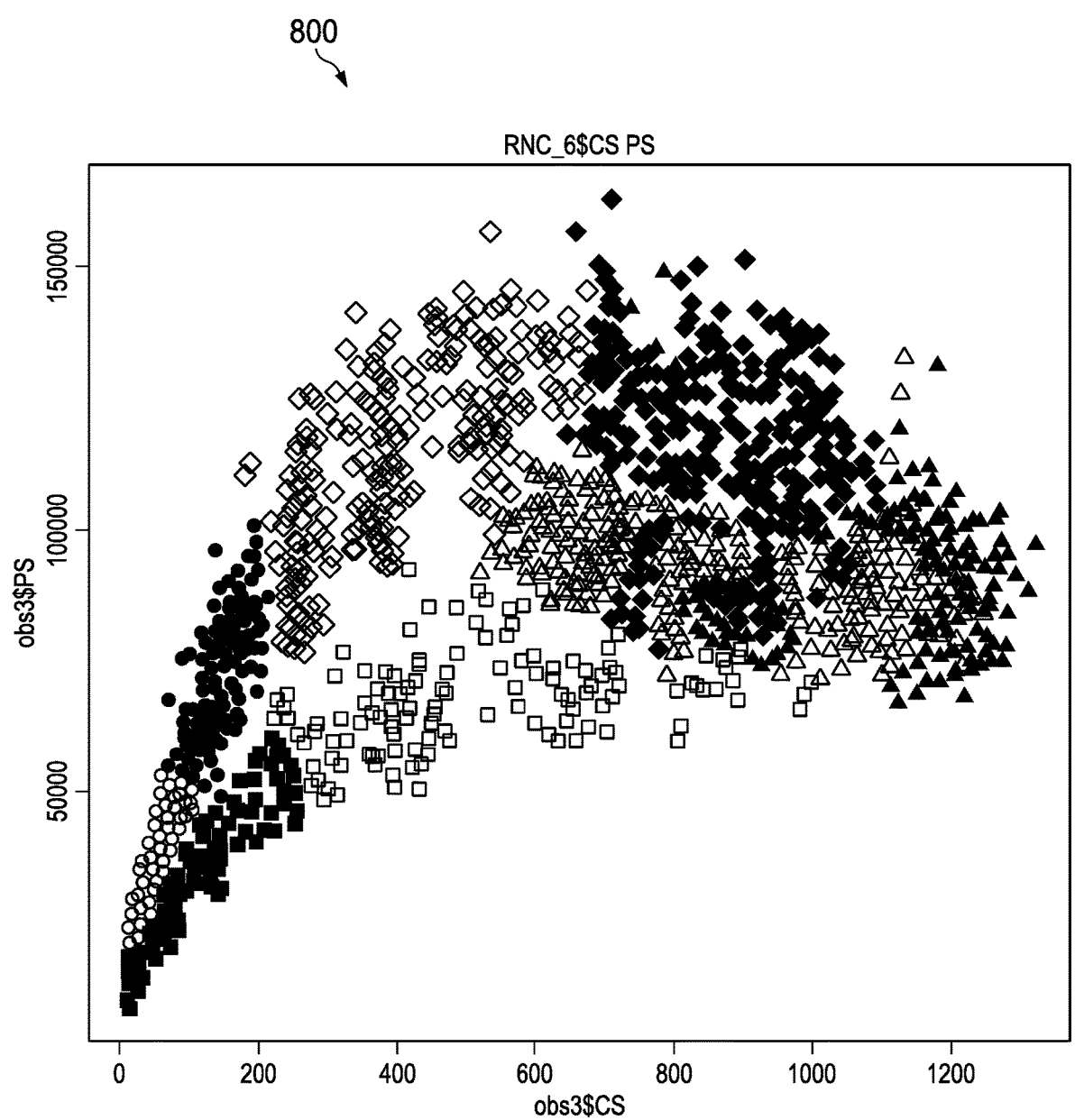
FIG. 8 is a diagram that shows results based on 90 days of circuit switched (CS) and packet switched (PS) traffic data (every ½ hour) from a plurality of RNCs in GZ, China.

FIG. 8 is a diagram that shows results 800 based on 90 days of circuit switched (CS) and packet switched (PS) traffic data (every ½ hour) from a plurality of RNCs in GZ, China. The focus was on RNC #6. This data can be analyzed to learn the underlying patterns. In an embodiment, such learning is used to detect unusual or anomalous patterns and predict the future given the past and present.

In an embodiment, the focus is on "time series" analysis with unsupervised learning (no labeling of historical data needed) using temporal signatures (waveform shapes) to determine anomalies. Unsupervised Learning via Max likelihood (EM algorithm) to train HMM. A table summary of results from the 90 days of CS and PS traffic data in FIG. 8 is provided in the Table below.

| Table Summary of Results | | | | | | | | | |
|---|---|---|---|---|---|---|---|---|---|
| RNC_6 | HMM | .05 | .10 | .25 | .50 | .75 | .90 | .95 | CURR |
| Ntest = 184 | | −207.6 | −204.5 | −199.2 | −196.2 | −190.7 | −178.1 | −175.0 | >−170 |
| RMSE(CS) | 96.5 | 95.1 | 96.0 | 92.4 | 89.1 | 83.3 | 81.6 | 84.5 | 89.6 |
| RMSE(PS) | 9772 | 9857.4 | 9507.2 | 8567.2 | 8407.9 | 8362.4 | 8680.6 | 8640.4 | 8871.1 |

Figure 9:
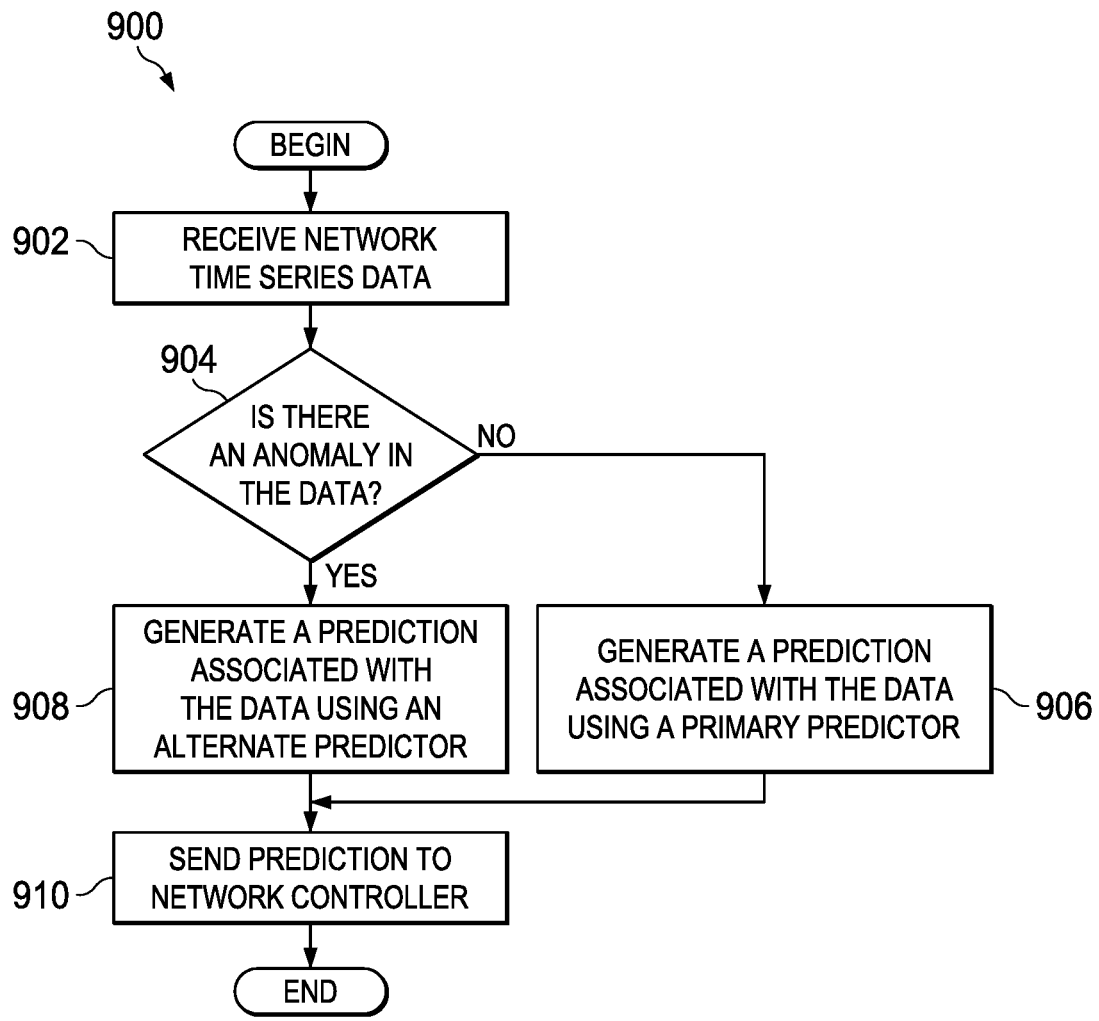
FIG. 9 is a flowchart of an embodiment of a method for adaptive anomaly based prediction of network time series data.

FIG. 9 is a flowchart of an embodiment of a method 900 for adaptive anomaly based prediction of network time series data. The method 900 begins at block 902 where a predictor receives network time series data. The predictor includes an anomaly detector that may have been trained using historical data. At block 904, the anomaly detector determines if there is an anomaly in the network time series data 904. If, at block 904, no anomaly is detected in the network time series data, then the method 900 proceeds to block 906 where the predictor generates a prediction associated with the data using a primary predictor. The primary predictor may have been trained using historical or test data. If, at block 904, an anomaly is detected, then the method 900 proceeds to block 908 where the predictor generates a prediction associated with the data using an alternate predictor. The alternate predictor may be a current data predictor. After completing the steps of either block 906 or block 908, the method 900 proceeds to block 910 where the predictor sends the prediction to a network controller, where the network controller uses the prediction to make network resource allocation decisions or other network management decisions. After completing the steps of block 910, the method 900 ends.

Figure 10:
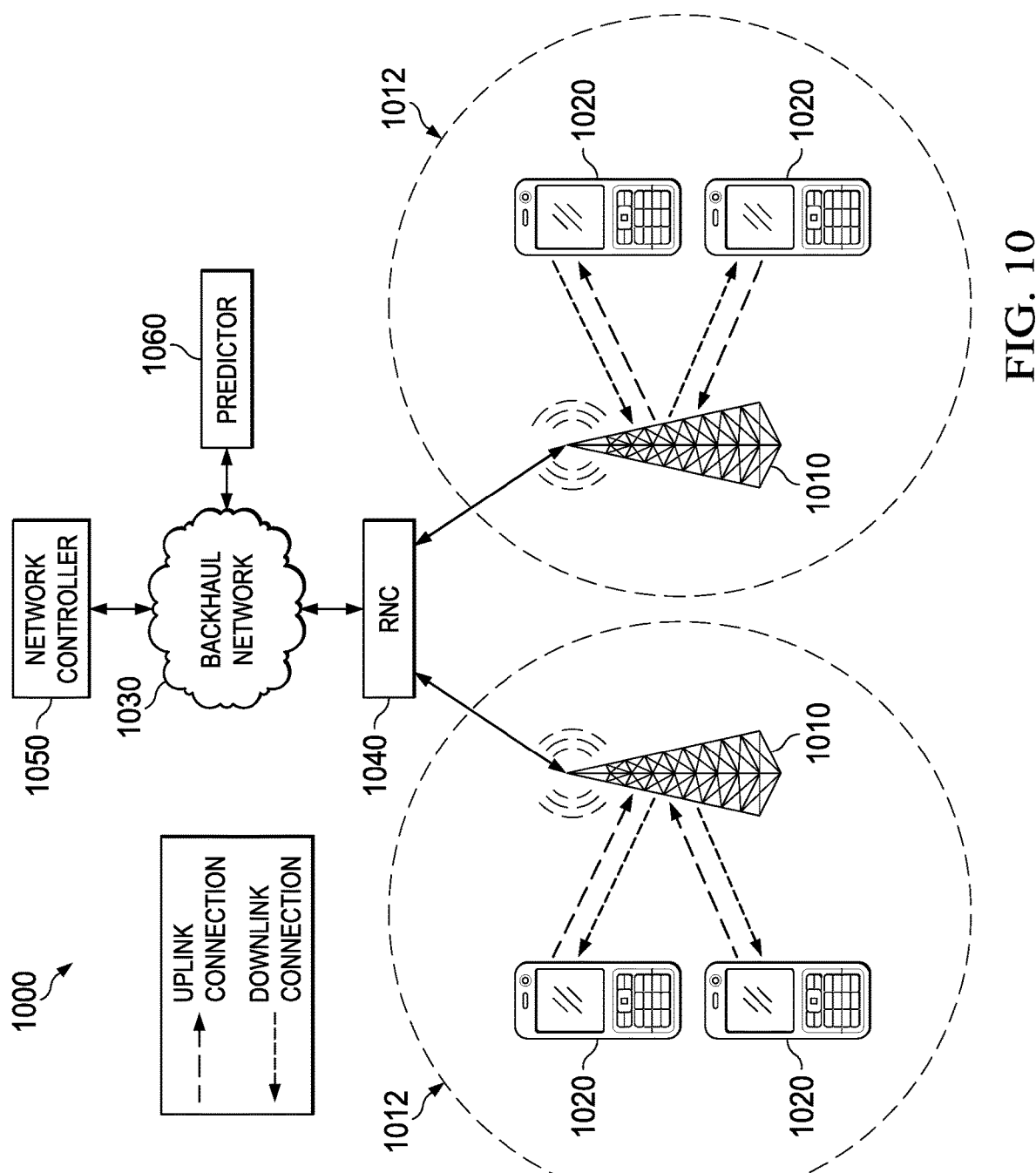
FIG. 10 illustrates an embodiment of a network for communicating data.

FIG. 10 illustrates a network 1000 for communicating data. The network 1000 comprises a plurality of access points (APs) 1010 having coverage areas 1012, a plurality of user equipment (UEs) 1020, a backhaul network 1030, an RNC 1040, a network controller 1050, and a predictor 1060. As used herein, the term AP may also be referred to as a TP and the two terms may be used interchangeably throughout this disclosure. The APs 1010 may comprise any component capable of providing wireless access by, inter alia, establishing uplink (dashed line) and/or downlink (dotted line) connections with the UEs 1020, such as a base station transceiver (BST), an enhanced base station (eNB), a femtocell, and other wirelessly enabled devices. The UEs 1020 may comprise any component capable of establishing a wireless connection with the APs 1010. The backhaul network 1030 may be any component or collection of components that allow data to be exchanged between the APs 1010 and a remote end (not shown). In some embodiments, the network 1000 may comprise various other wireless devices, such as relays, femtocells, etc. The RNC 1040 carries out radio resource management, some mobility management functions, and is the point where encryption is done before user data is sent to and from the UEs 1020. The APs 1010 are connected to the backhaul network 1030 and controlled by the RNC 1040. The predictor 1060 provides prediction of various network time series data and sends its predictions to the network controller 1050 and/or the RNC 1040. The predictor 1060 implements embodiments of the disclosed methods for adaptive anomaly based prediction as described above. The network controller 1050 uses the predictions to make decision choices (e.g., allocation of network resources) based on the future predicted value of key performance metrics. Examples of decision choices include, for example, Wireless Network Self Optimization or SON, e.g., Mobility Load Balancing. The predictor may be incorporated with other network management devices and may be co-located with the network controller 1050 or the RNC 1040.

The methods and components described above may be implemented on any general-purpose computing device, such as a computer or network component with sufficient processing power, memory resources, and network throughput capability to handle the necessary workload placed upon it.

Figure 11:
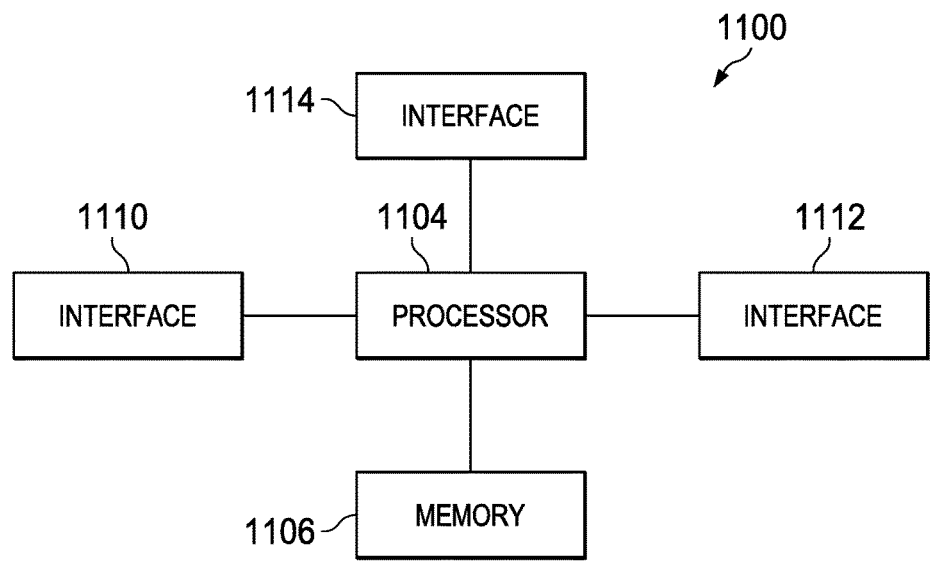
FIG. 11 illustrates a block diagram of an embodiment processing system for performing methods described herein, which may be installed in a host device.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1110, 1112, 1114 connects the processing system 1100 to a transceiver adapted to transmit and receive signaling over the telecommunications network.

Figure 12:
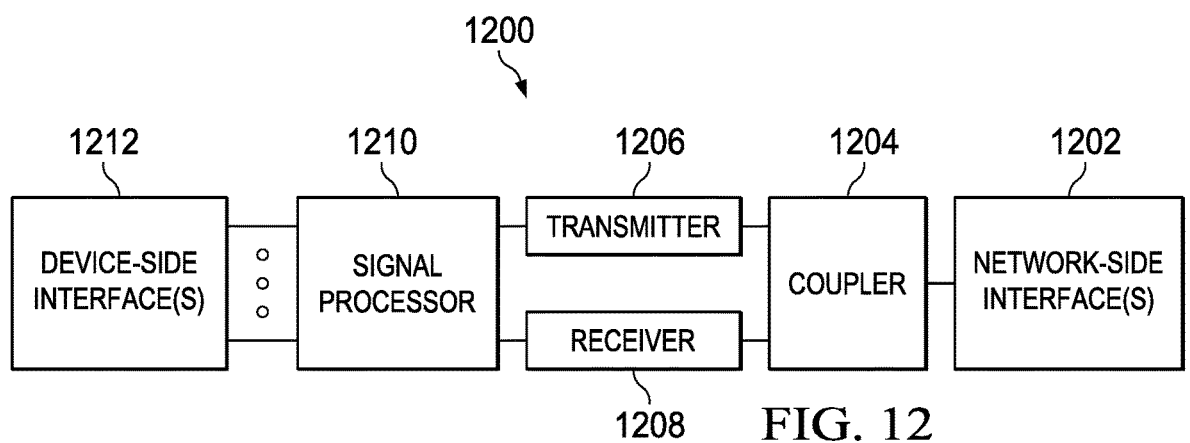
FIG. 12 illustrates a block diagram of a transceiver adapted to transmit and receive signaling over a telecommunications network.

FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The non-transitory computer-readable media includes all types of non-transitory memory, including magnetic storage media, optical storage media, flash media and solid state storage media.

It should be understood that software can be installed in and sold with the _ device. Alternatively the software can be obtained and loaded into the _ device, including obtaining the software through physical medium or distribution system, including, for example, from a server owned by the software creator or from a server not owned but used by the software creator. The software can be stored on a server for distribution over the Internet, for example.

An embodiment computer-implemented method in a network component for predicting values of future network time series data includes receiving, with one or more receivers, network time series data; determining, with one or more processors, whether an anomaly is detected in the network time series data; generating, with the one or more processors, a prediction associated with the network data according to a primary predictor when no anomaly is detected in the network time series data; generating, with the one or more processors, the prediction associated with the network data according to an alternative predictor when an anomaly in the network time series data is detected; and sending, with one or more transmitters, the prediction to a network controller, wherein the network controller uses the prediction to adjust network parameters. In an embodiment, the primary predictor is trained according to historical data. In an embodiment, the determining whether an anomaly is detected includes comparing previous predictions determined according to the primary predictor with observed values. In an embodiment, the anomaly is detected when a predicted value determined according to the primary predictor differs from an observed value by more than a threshold. In an embodiment, the anomaly is detected when the number of predicted values determined according to the primary predictor that differ from corresponding observed values by more than a threshold exceeds a predefined number within a specified time period. In an embodiment, the primary predictor comprises a Hidden Markov Model. In an embodiment, determining whether an anomaly is detected in the network time series data comprises determining the anomaly according to a Hidden Markov Model. In an embodiment, the alternative predictor includes a current data predictor or a Gaussian Mixture Model (GMM). In an embodiment, determining whether an anomaly is detected includes determining a likelihood of occurrence of the observed data point. In an embodiment, the anomaly is detected when the number of calculated likelihood values that fall below a threshold exceeds a predefined number within a specified time period. In an embodiment, the likelihood is computed according to a Gaussian Mixture Model (GMM) model built from the historical data. In an embodiment, the GMM model includes parameters leaned from the historical data. In an embodiment, the likelihood is computed according to a Hidden Markov Model (HMM) model built from the historical data. In an embodiment, the HMM model includes parameters learned from the historical data.

An embodiment network component includes a processor and a non-transitory computer readable storage medium storing programming for execution by the processor, the programming including instructions for: receiving, at the network component, network time series data; determining, with the network component, whether an anomaly is detected in the network time series data; generating a prediction associated with the network data according to a primary predictor when no anomaly is detected in the network time series data; generating the prediction associated with the network data according to an alternative predictor when an anomaly in the network time series data is detected; and sending, with the network component, the prediction to a network controller, wherein the network controller uses the prediction to adjust network parameters. In an embodiment, the primary predictor is trained according to historical data. In an embodiment, determining whether an anomaly is detected comprises comparing previous predictions determined according to the primary predictor with observed values. In an embodiment, the anomaly is detected when a predicted value determined according to the primary predictor differs from an observed value by more than a threshold. In an embodiment, the anomaly is detected when the number of predicted values determined according to the primary predictor that differ from corresponding observed values by more than a threshold exceeds a predefined number within a specified time period. In an embodiment, the primary predictor includes a Hidden Markov Model. In an embodiment, determining whether an anomaly is detected in the network time series data includes determining the anomaly according to a Hidden Markov Model. In an embodiment, the alternative predictor includes one of a current data predictor or a Gaussian Mixture Model (GMM). In an embodiment, determining whether an anomaly is detected includes determining a likelihood that the primary predictor will accurately predict a next observed data value within a specified range of acceptable values. In an embodiment, determining whether an anomaly is detected includes determining a likelihood of occurrence of the observed data point. In an embodiment, the anomaly is detected when the number of calculated likelihood values that fall below a threshold exceeds a predefined number within a specified time period. In an embodiment, the likelihood is computed according to a Gaussian Mixture Model (GMM) model built from the historical data. In an embodiment, the GMM model includes parameters leaned from the historical data. In an embodiment, the likelihood is computed according to a Hidden Markov Model (HMM) model built from the historical data. In an embodiment, the HMM model includes parameters learned from the historical data.

One embodiment includes a non-transitory computer-readable media storing computer instructions that, when executed by one or more processors, is for predicting values of future network time series data, cause the one or more processors to perform the steps of: training an adaptive anomaly detection based predictor with training data; receiving network time series data; determine whether to use a primary predictor or an alternate predictor according to whether an anomaly is detected in the network time series data; generating a prediction associated with the network data according to a primary predictor when no anomaly is detected in the network time series data; generating the prediction associated with the network data according to an alternative predictor when an anomaly in the network time series data is detected; and sending the prediction to a network controller, wherein the network controller uses the prediction to adjust network parameters. In an embodiment, the step of determining whether to use a primary predictor or an alternate predictor includes applying a log-likelihood function to the network time series data. In an embodiment, the step of determining whether to use a primary predictor or an alternate predictor includes applying a Hidden Markov Model to the network time series data. In an embodiment, the primary predictor includes a Hidden Markov Model. In an embodiment, the alternative predictor includes one of a current data predictor and a Gaussian Mixture Model (GMM).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A computer-implemented method in a network component for predicting values of future network time series data, comprising:
   receiving, with one or more receivers, first network time series data and second network time series data, both the first network time series data and the second network time series data being historical data associated with traffic patterns over a mobile access network;
   detecting, by one or more processors of a single network device, an anomaly in the second network time series data, and no anomaly being detected in the first network time series data;
   generating, by the one or more processors of the single network device, a first prediction of a future network condition using the first network time series data according to a Hidden Markov Model (HMM) upon determining that no anomaly is detected in the first network time series data and a second prediction of a future network condition using the second network time series data according to a Gaussian Mixture Model (GMM) upon detecting the anomaly in the second network time series data, the first prediction of the future network condition being generated according to the HMM without relying on the GMM and the second prediction of the future network condition being generated according to the GMM without relying on the HMM; and
   sending, with one or more transmitters, the first prediction and the second prediction to a network controller to prompt the network controller to adjust network parameters based on the first prediction and the second prediction.

2. The computer-implemented method of claim 1, wherein the HMM is trained according to the historical data.

3. The computer-implemented method of claim 1, wherein the anomaly is detected in the second network time series data based on a likelihood of occurrence of an observed data point.

4. The computer-implemented method of claim 3, wherein the anomaly is detected in the second network time series data based on a number of calculated likelihood values that fall below a threshold exceeding a predefined number within a specified time period.

5. The computer-implemented method of claim 3, wherein the likelihood is computed according to the GMM model.

6. The computer-implemented method of claim 5, wherein the GMM model comprises parameters learned from the historical data.

7. The computer-implemented method of claim 1, wherein the HMM model comprises parameters learned from the historical data.

8. A network component comprising:
   a processor; and
   a non-transitory computer readable storage medium storing programming for execution by the processor, the programming including instructions for:
   receiving, with one or more receivers, first network time series data and second network time series data, both the first network time series data and the second network time series data being historical data associated with traffic patterns over a mobile access network;
   detecting an anomaly in the second network time series data, and no anomaly being detected in the first network time series data;
   generating a first prediction of a future network condition using the first network time series data according to a Hidden Markov Model (HMM) upon determining that no anomaly is detected in the first network time series data and a second prediction of a future network condition using the second network time series data according to a Gaussian Mixture Model (GMM) upon detecting the anomaly in the second network time series data, the first prediction of the future network condition being generated according to the HMM without relying on the GMM and the second prediction of the future network condition being generated according to the GMM without relying on the HMM; and
   sending, with one or more transmitters, the first prediction and the second prediction to a network controller to prompt the network controller to adjust network parameters based on the first prediction and the second prediction.

9. The network component of claim 8, wherein the HMM is trained according to historical data.

10. The network component of claim 8, wherein the anomaly is detected in the second network time series data based on a likelihood of occurrence of an observed data point.

11. The network component of claim 10, wherein the anomaly is detected in the second network time series data based on a number of calculated likelihood values that fall below a threshold exceeding a predefined number within a specified time period.

12. The network component of claim 10, wherein the likelihood is computed according to the GMM model.

13. The network component of claim 12, wherein the GMM model comprises parameters learned from the historical data.

14. The network component of claim 8, wherein the HMM model comprises parameters learned from the historical data.

15. A non-transitory computer-readable media storing computer instructions for predicting values of future network time series data, that when executed by one or more processors of a single network device, cause the one or more processors to perform the steps of:
   receiving, with one or more receivers, first network time series data and second network time series data, both the first network time series data and the second network time series data being historical data associated with traffic patterns over a mobile access network;
   detecting an anomaly in the second network time series data, and no anomaly being detected in the first network time series data;

generating a first prediction of a future network condition using the first network time series data according to a Hidden Markov Model (HMM) upon determining that no anomaly is detected in the first network time series data and generating a second prediction of a future network condition using the second network time series data according to a Gaussian Mixture Model (GMM) upon detecting the anomaly in the second network time series data, the first prediction of the future network condition being generated according to the HMM without relying on the GMM and the second prediction of the future network condition being generated according to the GMM without relying on the HMM; and sending, with one or more transmitters, the first prediction and the second prediction to a network controller to prompt the network controller to adjust network parameters based on the first prediction and the second prediction.

16. The non-transitory computer-readable media of claim 15, wherein the HMM is trained according to historical data.

17. The non-transitory computer-readable media of claim 15, the anomaly is detected in the second network time series data based on the GMM model.

18. The non-transitory computer-readable media of claim 15, wherein the GMM model comprises parameters learned from the historical data.

* * * * *